(12) United States Patent
Yokote

(10) Patent No.: US 8,599,200 B2
(45) Date of Patent: Dec. 3, 2013

(54) INFORMATION PROCESSING APPARATUS, DISPLAY CONTROLLING METHOD, AND DISPLAY CONTROLLING APPARATUS

(75) Inventor: Satoshi Yokote, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 13/248,414

(22) Filed: Sep. 29, 2011

(65) Prior Publication Data

US 2012/0249524 A1    Oct. 4, 2012

(30) Foreign Application Priority Data

Mar. 31, 2011    (JP) .................................. 2011-080105

(51) Int. Cl.
*G06T 15/00* (2011.01)

(52) U.S. Cl.
USPC ................. 345/419; 345/158; 348/51; 348/54

(58) Field of Classification Search
USPC ................................ 345/419, 158; 348/51, 54
See application file for complete search history.

(56) References Cited

U.S. PATENT DOCUMENTS

| 7,940,956 | B2 | 5/2011 | Kinoshita et al. | |
| 2009/0207237 | A1* | 8/2009 | Leveco et al. | 348/51 |
| 2010/0013981 | A1 | 1/2010 | Yasuda | |
| 2010/0171697 | A1* | 7/2010 | Son et al. | 345/158 |
| 2010/0238276 | A1* | 9/2010 | Takagi et al. | 348/54 |

FOREIGN PATENT DOCUMENTS

| JP | 07-168529 | 7/1995 |
| JP | 2001-195582 | 7/2001 |
| JP | 2004-104425 | 4/2004 |
| JP | 2006-121553 | 5/2006 |
| JP | 2007-006052 | 1/2007 |
| JP | 2007-042072 | 2/2007 |
| JP | 2009-020190 | 1/2009 |
| JP | 2009-271557 | 11/2009 |
| JP | 2011-050583 | 3/2011 |

OTHER PUBLICATIONS

Japanese Office Action for Corresponding Japanese Application No. 2011-080105, dated May 23, 2012, in 6 pages.
Japanese Office Action for Japanese Application No. 2011-080105, Mailed Jan. 17, 2012, in 4 pages.

* cited by examiner

*Primary Examiner* — Phu K Nguyen
(74) *Attorney, Agent, or Firm* — Knobbe, Martens, Olson & Bear LLP

(57) ABSTRACT

According to an embodiment, an information processing apparatus includes an image pickup element, a face recognizing section configured to recognize a face of a person on the basis of image data obtained through image pickup by the image pickup element, and a display controlling section configured to perform display control so as to perform 3D display based on 3D picture data generated from 2D picture data even if a viewing position of a person cannot be identified by face recognition by the face recognizing section, when an instruction for 3D display is given.

7 Claims, 2 Drawing Sheets

INFORMATION PROCESSING APPARATUS, DISPLAY CONTROLLING METHOD, AND DISPLAY CONTROLLING APPARATUS

CROSS-REFERENCE TO RELATED APPLICATION

This application is based upon and claims the benefit of priority from the Japanese Patent Application No. 2011-80105, filed on Mar. 31, 2011; the entire contents of which are incorporated herein by reference.

FIELD

An embodiment described herein relates generally to an information processing apparatus, a display controlling method, and a display controlling apparatus.

BACKGROUND

Apparatuses have been known which can switch between 2D display, which refers to displaying a two-dimensional (i.e., 2D) original picture, and 3D display, which refers to displaying a right-eye picture and a left-eye picture that are generated on the basis of the 2D original picture so as to be recognized as a picture with 3D effects (a stereo picture, i.e., a 3D picture).

For example, a technique has recently been proposed which can detect a face of a person viewing a screen and, if a face of such a person can be detected, can switch a picture being displayed on the screen from 2D display to 3D display and display a 3D picture to suit a position of the face or eyes of the person when the picture being displayed on the screen is switched to 3D display, in a personal computer (hereinafter referred to as a PC).

However, according to the technique, when a position of a face of a user viewing a 3D picture is near a boundary of a face recognizable range, frequent switching between successful face recognition and unsuccessful face recognition may occur. In the case, display switching such as switching of screen display from 3D display to 2D display or switching from 2D display back to 3D display occurs frequently, and the user finds difficulty in viewing a 3D picture.

DETAILED DESCRIPTION

An information processing apparatus according to an embodiment includes an image pickup section, a face recognizing section configured to recognize a face of a person on the basis of image data obtained through image pickup by the image pickup section, and a display controlling section configured to perform display control so as to perform 3D display based on 3D picture data generated from 2D picture data even if a first case occurs where a viewing position of the person cannot be identified through the face recognition by the face recognizing section, when an instruction for 3D display is given.

A display controlling method according to the embodiment includes performing a process of recognizing a face of a person on the basis of image data obtained through image pickup by an image pickup section and performing display control so as to perform 3D display based on 3D picture data generated from 2D picture data even if a first case occurs where a viewing position of the person cannot be identified through the face recognition by the face recognizing section, when an instruction for 3D display is given.

A display controlling apparatus according to the embodiment includes a display controlling section configured to perform display control so as to perform 3D display based on 3D picture data generated from 2D picture data even if a first case occurs where a viewing position of the person which is based on the face recognition cannot be identified, when a result of recognizing a face of a person which is based on image data obtained through image pickup by an image pickup section and an instruction for 3D display are received.

The embodiment will be described below with reference to the drawings.

(Configuration)

Figure 1:
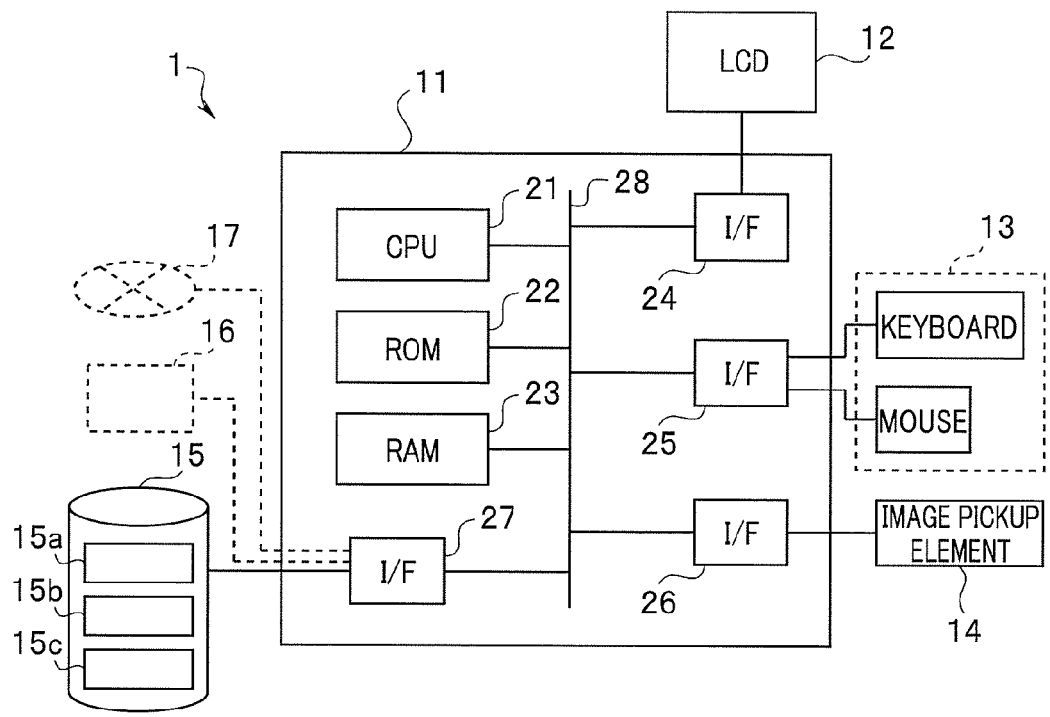
FIG. 1 is a diagram of a configuration of an information processing apparatus according to an embodiment.

FIG. 1 is a diagram of a configuration of an information processing apparatus according to the embodiment. In the present embodiment, the information processing apparatus is a PC such as a desktop PC, a notebook PC, or a slate PC. As shown in FIG. 1, a PC 1 serving as an information processing apparatus includes a main body 11, a liquid crystal display (hereinafter referred to as an LCD) 12, an input device 13, an image pickup element 14, and a storage device 15.

The main body 11 includes a CPU 21, a ROM 22, a RAM 23, and interfaces (hereinafter abbreviated as I/Fs) 24, 25, 26, and 27. The CPU 21, the ROM 22, the RAM 23, and the interfaces 24, 25, 26, and 27 are connected to one another via a bus 28.

The LCD 12 as a display section is connected to the bus 28 via the I/F 24 and is a display device capable of displaying a picture in 2D or in 3D. The LCD 12 includes an LCD panel and displays a picture in 2D or in 3D on a screen under control of a display controlling section (to be described later).

The CPU 21 executes various software programs stored in the ROM 22 using the RAM 23 as a work area.

The input device 13 includes a keyboard and a mouse and is connected to the bus 28 via the I/F 25. A user can enter various commands such as an instruction for 3D display and an instruction for 3D viewing position adjustment by manipulating the input device 13. For example, 3D viewing position adjustment can be performed by a user freely moving a 3D viewing position in a horizontal direction using left and right arrow keys in the keyboard or a cursor on the screen.

The image pickup element 14 as an image pickup section is, e.g., a Web camera such as a CMOS sensor for picking up an image of a face of a user and is connected to the bus 28 via the I/F 26. The image pickup element 14 is arranged, e.g., near the LCD 12 to pick up an image of a face of a user viewing the screen of the LCD 12. The image pickup element 14 is configured to shoot a person or the like viewing the screen of the LCD 12 and acquire and output an image of the subject obtained through the shooting substantially in real time.

The storage device 15 is, e.g., a hard disk drive or a non-volatile memory and is connected to the bus 28 via the I/F 27. The storage device 15 stores 2D picture data 15a which is an original image and a display controlling program 15b. The display controlling program 15b is a control program for generating a 3D picture on the basis of 2D picture data and performing 3D display on the LCD 12 in accordance with a user instruction. Note that the display controlling program 15b may be stored in the ROM 22.

More specifically, the display controlling program 15b controls display on the LCD 12 so as to selectively switch between 2D display of picture data of a 2D original picture read from the storage device 15 and 3D display using 3D data generated on the basis of the 2D original picture, i.e., right-eye picture data and left-eye picture data, on the basis of a recognition result of face recognition based on image data from the image pickup element 14.

Note that picture data here may be picture data stored in a storage medium such as a DVD or picture data read onto the CPU 21 via a storage medium drive 16, as indicated by a dotted line in FIG. 1. Alternatively, the picture data may be picture data received over a network 17 such as the Internet, as indicated by a dotted line in FIG. 1.

When a user enters an instruction for 3D display, 2D picture data is converted into 3D picture data under control of the display controlling program 15b. For this reason, the PC 1 stores a 3D display-enabled application program 15c configured to generate 3D picture data from 2D picture data in the storage device 15. The 3D display-enabled application program is read and executed by the CPU 21 under control of the display controlling program 15b. Note that the 3D display-enabled application program 15c as a 3D picture generating section may be stored in the ROM 22. Also, note that the 3D display-enabled application program 15c may be composed of a 3D picture generating circuit as a piece of hardware.

Figure 2:
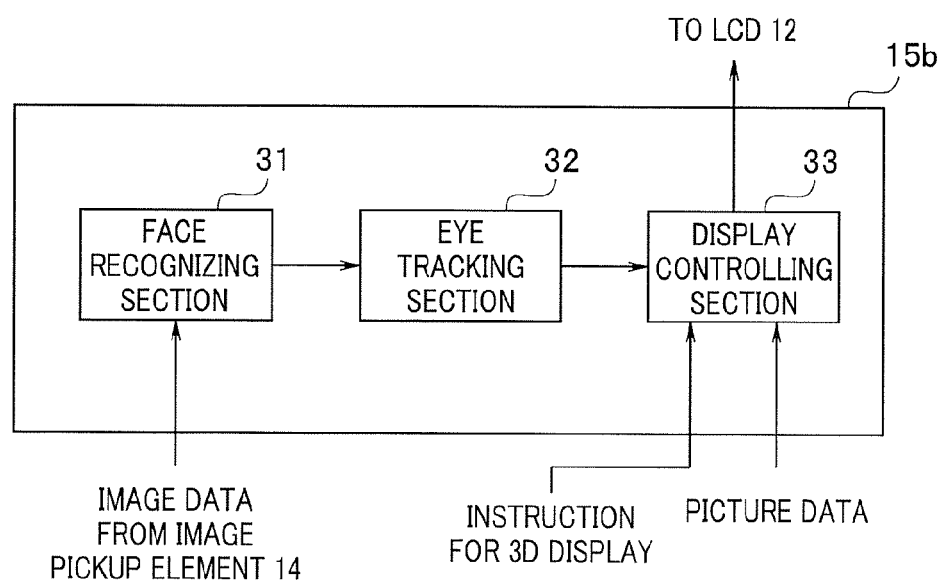
FIG. 2 is a block diagram showing a configuration of a display controlling program 15b according to the embodiment.

FIG. 2 is a block diagram showing a configuration of the display controlling program 15b. The display controlling program 15b includes a face recognizing section 31, an eye tracking section 32, and a display controlling section 33.

The face recognizing section 31 performs a process of recognizing a face of a person on the basis of image data obtained by the image pickup element 14 through image pickup. If a face of a person is recognized from image data, the face recognizing section 31 outputs information on a position of the recognized face. On the other hand, if a face cannot be recognized, the face recognizing section 31 does not output information on a position of a face. Note that the face recognizing section 31 may generate and output failure information indicating a failure in face recognition if a face cannot be recognized.

The face recognizing section 31 detects a portion corresponding to a face of a person from, e.g., image data obtained by the image pickup element 14 on the basis of distribution of eyes, a nose, a mouth, and the like which are features of a person.

The eye tracking section 32 is a processing section for implementing an eye tracking function or a face tracking function. The eye tracking function or the face tracking function is a function of analyzing which point or area on the screen, for how long, and along which trajectory a user is viewing, from movement of a line of sight of a person image-captured by the image pickup element 14. That is, the eye tracking section 32 is a processing section configured to perform the eye tracking function or the face tracking function while receiving a recognition result of face recognition from the face recognizing section 31. It can be said therefore that the eye tracking section 32 is a face tracking section that implements the face tracking function. In this embodiment, the eye tracking section 32 is explained as the eye tracking section.

A processing result of face recognition by the face recognizing section 31 can be used here when the eye tracking function is on.

The display controlling section 33 performs a display controlling process (to be described later) on the basis of face recognition result information from the eye tracking section 32. In the process in the display controlling section 33, 3D display is controlled on the basis of presence or absence of an instruction for 3D display, an on/off status of the eye tracking function of the eye tracking section 32, and a processing result of face recognition. At the time of 3D display, the display controlling section 33 outputs 3D picture data generated by the 3D display-enabled application program to the LCD 12.

The display controlling section 33 may be implemented by a semiconductor chip which is a semiconductor device. For example, the display controlling section 33 may be implemented as a semiconductor chip including a circuit configured to perform the display controlling process in the display controlling section 33. The semiconductor chip performs the display controlling process in the display controlling section 33 as a display controlling apparatus.

(Operation)

Figure 3:
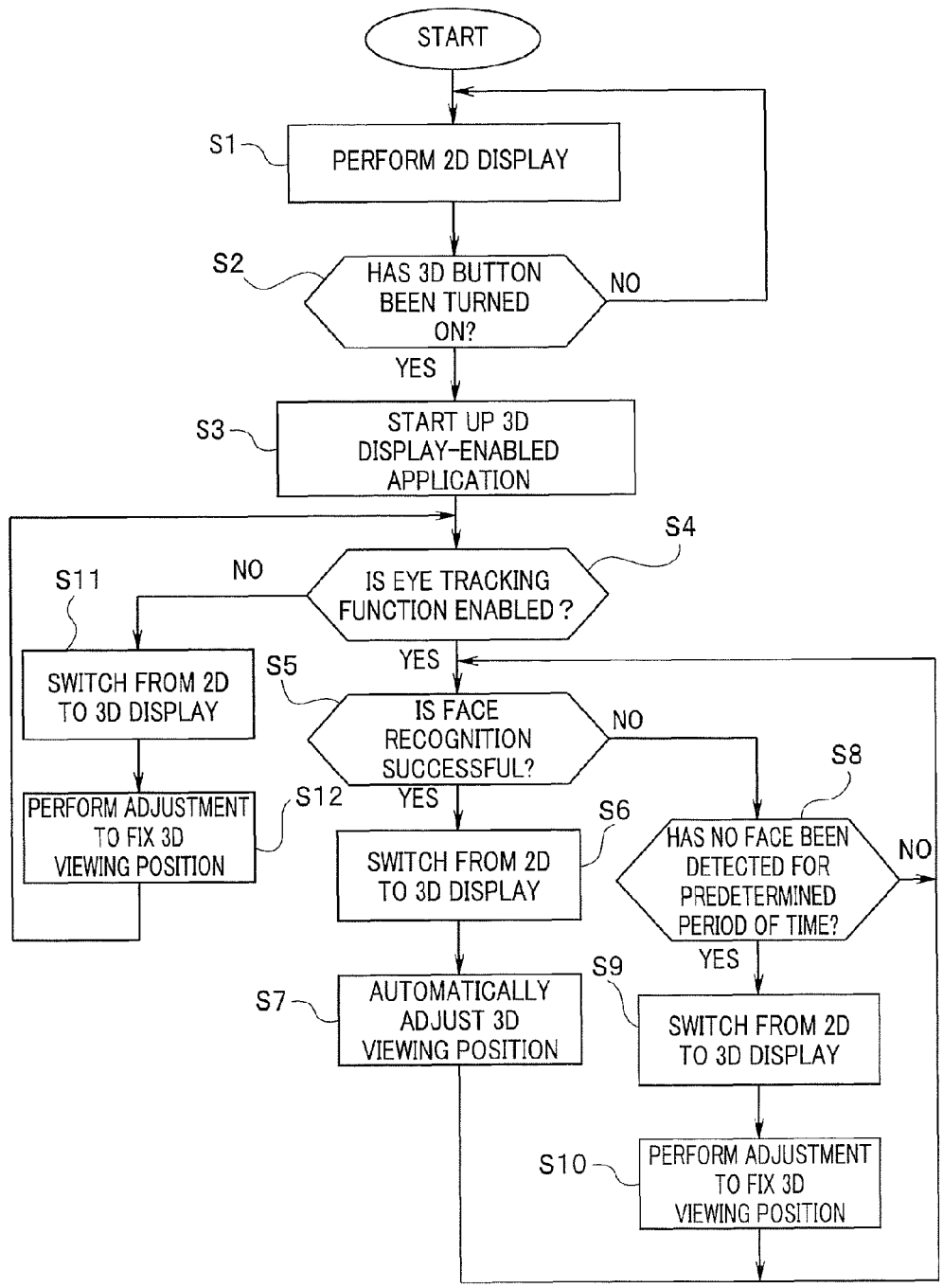
FIG. 3 is a flow chart showing an example of a flow of a display controlling process in a display controlling section 33, according to the embodiment.

FIG. 3 is a flow chart showing an example of a flow of the display controlling process in the display controlling section 33. The display control in FIG. 3 is performed by the CPU 21.

First, when a picture based on 2D picture data is to be displayed, the CPU 21 displays the 2D picture data in 2D (S1). That is, the CPU 21 outputs the 2D picture data to the LCD 12.

If a user wants to view the 2D picture data in 3D, the user enters a predetermined command as an instruction for 3D display using the input device 13. For example, the user depresses a predetermined button (hereinafter referred to as a 3D button). Accordingly, the CPU 21 determines whether the 3D button has been depressed, i.e., the 3D button has been turned on (S2). If the 3D button has not been turned on (S2: NO), the flow returns to S1 to perform 2D display.

If the 3D button has been turned on (S2: YES), the CPU 21 starts up the 3D display-enabled application program 15c (S3).

The CPU 21 determines whether the eye tracking function is on (S4). If it is determined that the eye tracking function is on (S4: YES), the CPU 21 determines whether face recognition is successful (S5). Whether face recognition is successful is determined on the basis of a processing result from the face recognizing section 31.

If face recognition is successful (S5: YES), the CPU 21 switches picture display from 2D display to 3D display (S6). That is, the CPU 21 supplies 3D picture data generated by the 3D display-enabled application program 15c to the LCD 12.

The CPU 21 automatically adjusts a 3D viewing position on the basis of a result of the face recognition (S7). The automatic adjustment is performed on the basis of the eye tracking function. More specifically, if an instruction for 3D display has been received, the eye tracking function is enabled, and the face recognizing section can recognize a face or a viewing position of a person can be identified, the display controlling section 33 automatically adjusts the 3D viewing position according to a recognition result of face recognition and performs 3D display.

If the face recognition is unsuccessful (S5: NO), i.e., a face cannot be recognized, i.e., a viewing position of a person cannot be identified, the CPU 21 determines whether a predetermined condition has been met (in the present embodiment, whether a predetermined period of time has passed) (S8).

If a state in which a face cannot be recognized, i.e., a viewing position of a person cannot be identified lasts for the predetermined period of time (e.g., 3 seconds) (S8: YES), the CPU 21 switches the picture display from 2D display to 3D display (S9). That is, the CPU 21 supplies the 3D picture data generated by the 3D display-enabled application program 15*c* to the LCD 12.

The CPU 21 performs adjustment to fix the 3D viewing position to a predetermined viewing position (S10). For example, if face recognition fails while the CPU 21 is automatically adjusting the 3D viewing position on the basis of face recognition results (S7), the predetermined viewing position is fixed to the 3D viewing position immediately before the failure. More specifically, if an instruction for 3D display has been received, the eye tracking function is enabled, and there is a change from a case where a face can be recognized by the face recognizing section 31 to a case where a viewing position of a person cannot be identified by the face recognizing section 31, the 3D viewing position is a position automatically adjusted according to a recognition result of face recognition before the change, which means that 3D display is continued with the 3D viewing position immediately before face recognition fails.

This is because it is believed to be preferable to keep the 3D viewing position at a latest position, for example, if a user is near a boundary of a face recognizable range, and face recognition is unsuccessful.

If the CPU 21 has not been automatically adjusting the 3D viewing position on the basis of face recognition results, the 3D viewing position may be fixed to a center position of the LCD 12. In such a case, since the 3D viewing position can be manually changed by a user, as described above, the 3D viewing position may be, e.g., a position adjusted by a user or a position adjusted and set in advance.

However, if a face is recognized before the predetermined period of time passes, a result of the determination in S8 is NO, and the flow returns to S5. In S5, face recognition is successful, and the 3D viewing position is automatically adjusted.

As described above, when an instruction for 3D display has been given, even if a viewing position of a person cannot be identified through face recognition by the face recognizing section 31, the display controlling section 33 performs display control so as to perform 3D display based on 3D picture data generated from 2D picture data. More specifically, if an instruction for 3D display is given by turning on the 3D button, and a face is recognized when the eye tracking function is enabled, the display controlling section 33 automatically adjusts the 3D viewing position and performs 3D display. Even if a face cannot be recognized, i.e., a viewing position of a person cannot be identified, the display controlling section 33 fixes the 3D viewing position to the predetermined viewing position and performs 3D display, in the event of a lapse of the predetermined period of time as the predetermined condition.

Consequently, even if a position of a user viewing a picture displayed on the LCD 12 is near the boundary of the face recognizable range, and switching between successful face recognition and unsuccessful face recognition occurs frequently, 3D display is performed or 3D display is continued under the predetermined condition, and switching between 2D display and 3D display does not occur frequently.

If a user intentionally turns off the eye tracking function, it is determined that the eye tracking function is off, i.e., disabled (S4: NO), and the CPU 21 switches the picture display from 2D display to 3D display (S11). The CPU 21 performs adjustment to fix the 3D viewing position to the predetermined viewing position (S12). More specifically, if an instruction for 3D display has been received, and the eye tracking function is disabled, the display controlling section 33 performs display control so as to fix the 3D viewing position to a second predetermined viewing position and perform 3D display.

In the fixation and adjustment in S12, the 3D viewing position is fixed to a predetermined viewing position (e.g., the center position of the screen). Note that the predetermined viewing position in the fixation and adjustment may be a viewing position manually set by a user or a position set in advance by a user.

When the 3D button is turned on, and the eye tracking function is off, no face is recognized. However, since the 3D button is on, the 3D viewing position is fixed to the predetermined viewing position to perform 3D display. The predetermined viewing position is the center position of the LCD 12, a position manually adjusted by a user, or the like. Accordingly, a user can view 3D display at the predetermined viewing position.

As described above, in an information processing apparatus according to the above-described embodiment, 3D display is performed under a predetermined condition, even in a situation in which a viewing position of a person cannot be identified. An information processing apparatus, a display controlling method, and a display controlling apparatus which make it easy for a user to view a 3D picture can thus be implemented.

Note that although the embodiment has described a PC as an information processing apparatus, the above-described display control can be applied to a television apparatus and the like. In the case, the television apparatus corresponds to an information processing apparatus configured to perform the display control.

While certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   an image acquisition module;
   a facial recognition module configured to recognize a face of a person using image data from the image acquisition module; and
   a display controller configured to:
      display a 3D image by adjusting a viewing location for 3D display based on an output from the facial recognition module in a first case when an instruction for performing the 3D display of the 3D image, which is generated by converting 2D picture data into 3D picture data, on a display section is given and a recognition result of facial recognition by the facial recognition module is usable and where the viewing location of the person viewing the 3D display which is displayed on the display section is determinable by the recognition result of the facial recognition by the facial recognition module,
      display the 3D image generated from the 2D picture data in a second case when the instruction for performing the 3D display is given and the recognition result of the facial recognition by the facial recognition module is usable and where the viewing location of the person viewing the 3D display is not determinable by the recognition result of the facial recognition module for a first period of time, and display the 3D image generated from the 2D picture data with the viewing location of the person viewing the 3D display fixed in a third case when the instruction for performing the 3D display is given and the recognition result of the facial recognition by the facial recognition module is not usable.

2. The information processing apparatus of claim 1, wherein
in the second case, the display controller is configured to display the 3D image with position information of the viewing location of the person viewing the 3D display fixed to a first value.

3. The information processing apparatus of claim 2, wherein
if there is a change from the first case where the viewing location of the person is determinable by the facial recognition module to the second case where the viewing location of the person is not determinable by the facial recognition module, the first value is adjusted based on the recognition result of the facial recognition by the facial recognition module prior to the change.

4. The information processing apparatus of claim 2, wherein the first value is changeable.

5. A display controlling method comprising:
performing facial recognition of a person by a facial recognition module on the basis of image data obtained from an image acquisition module;
determining whether or not an instruction for performing 3D display of a 3D image, which is generated by converting 2D picture data into 3D picture data, on a display section is given and whether or not a recognition result of the facial recognition by the facial recognition module is usable;
displaying the 3D image by adjusting a viewing location for the 3D display in accordance with an output from the facial recognition module in a first case when the instruction for performing the 3D display is given and the recognition result of the facial recognition by the facial recognition module is usable and where the viewing location of the person viewing the 3D display which is displayed on the display section is determinable b the recognition result of the facial recognition by the facial recognition module;
displaying the 3D image generated from the 2D picture data in a second case when the instruction for performing the 3D display is given and the recognition result of the facial recognition by the facial recognition module is usable and where the viewing location of the person viewing the 3D display is not determinable by the recognition result of the facial recognition module for a first period of time; and
displaying the 3D image generated from the 2D picture data with the viewing location of the person viewing the 3D display fixed in a third case when the instruction for performing the 3D display is given and the recognition result of the facial recognition by the facial recognition module is not usable.

6. The display controlling method of claim 5, wherein
in the second case, displaying the 3D image with position information of the viewing location of the person viewing the 3D display fixed to a first value.

7. The display controlling method of claim 6, further comprising
if there is a change from the first case where the viewing location of the person is determinable to the second case where the viewing location of the person is not determinable, adjusting the first value based on the recognition result of the facial recognition prior to the change.

* * * * *